Aug. 6, 1968   J. R. KUIPER ET AL   3,395,576
COMBINATION TURN, BANK AND CLIMB INDICATOR
Filed May 13, 1966   2 Sheets-Sheet 1

INVENTORS
JAMES R. KUIPER
LEE C. VERDUIN

BY
ATTORNEYS

Aug. 6, 1968  J. R. KUIPER ET AL  3,395,576
COMBINATION TURN, BANK AND CLIMB INDICATOR
Filed May 13, 1966  2 Sheets-Sheet 2

INVENTORS
JAMES R. KUIPER
LEE C. VERDUIN

BY
ATTORNEYS

United States Patent Office 3,395,576
Patented Aug. 6, 1968

3,395,576
COMBINATION TURN, BANK AND
CLIMB INDICATOR
James R. Kuiper and Lee C. Verduin, Grand Rapids,
Mich., assignors to R. C. Allen Business Machines, Inc.,
Grand Rapids, Mich., a corporation of Michigan
Filed May 13, 1966, Ser. No. 549,952
4 Claims. (Cl. 73—178)

ABSTRACT OF THE DISCLOSURE

Combination turn, bank and climb indicator including an indicia plate having climb and rate of turn indicia thereon, wherein the rate of turn indicia includes vertically spaced horizontal grid lines, and a movable climb indicator in the form of a vertically movable dot coacting with the climb indicia, and a movable turn indicator including a horizontal bar integral and vertically movable with the dot indicator and pivotally movable and having upwardly and outwardly inclined edges coacting with the vertically spaced grid lines.

---

This invention relates in general to an instrument for use in aircraft, and more particularly to an instrument for indicating turn, bank and climb maneuvers of an aircraft, and still more particularly to a combination turn, bank and climb indicating instrument that may be quickly and easily read by the operator of an aircraft, although other uses and purposes may be apparent to one skilled in the art.

Heretofore, it has been common to include in a single aircraft instrument a rate of turn indicator and a bank indicator, thereby necessitating a second instrument for indicating rate of climb. Thus, an operator of an aircraft heretofore would need to give attention to separate instruments to determine rate of turn, bank and rate of climb information.

It is therefore an object of the present invention to obviate the above named difficulties and to provide a new and improved aircraft instrument.

Another object of this invention is in the provision of a single aircraft instrument capable of giving information on rate of turn, bank and rate of climb maneuvers.

Still another object of this invention resides in the provision of a combination turn, bank and climb indicating instrument that is capable of giving corresponding maneuver information to the operator of an aircraft.

Other objects, features and advantages of the invention will be apparent from the following detailed disclosure, taken in conjunction with the accompanying sheets of drawings, wherein like reference numerals refer to like parts, in which.

Figure 1:
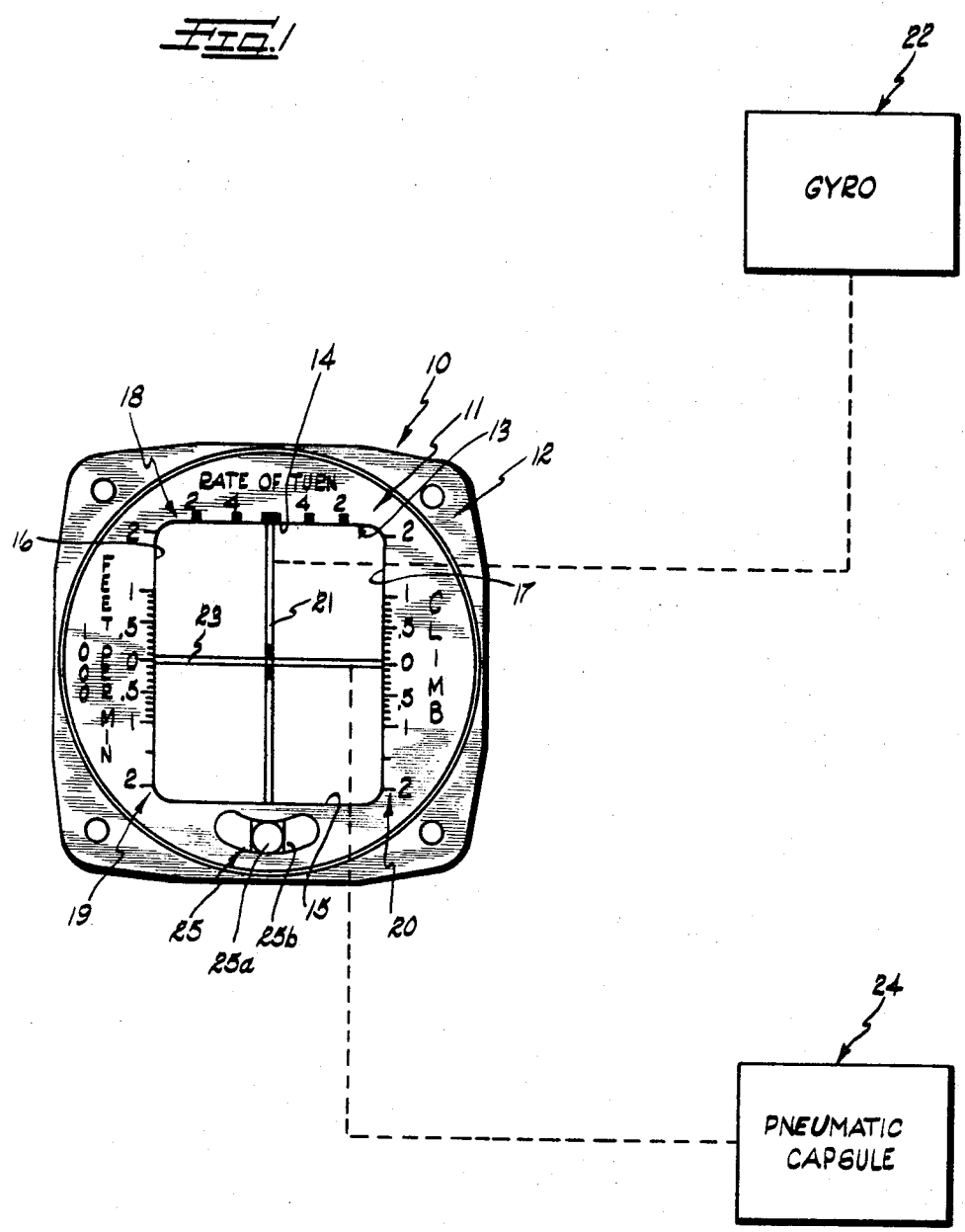
FIG. 1 shows an elevational view of an aircraft instrument according to the invention and diagrammatically illustrating means for driving the instrument.

Referring to the drawing, the instrument of the present invention includes a viewing panel 10 having an indicia plate 11 supported by a mounting ring 12 for mounting of the instrument in an instrument panel of an aircraft.

The indicia plate 11 is generally circular in shape and provided with a generally rectangular opening 13 centrally thereof that defines upper and lower edges 14 and 15 and opposed edges 16 and 17. The upper and lower edges extend generally horizontally and are parallel to each other, while the opposed side edges 16 and 17 extend generally vertically and are parallel to each other. Suitable rate of turn indicia 18 is provided along the upper horizontal edge 14, while suitable rate of climb indicia 19 and 20 is provided along the opposed side edges 16 and 17. It should be appreciated that the rate of turn indicia 18 may alternatively be arranged only along the lower horizontal edge 15 or along both the upper and lower edges 14 and 15. Similarly, the rate of climb indicia 19 or 20 may be eliminated or it can be shown along both side edges 16 and 17 as illustrated. The rate of climb indicia is identical on both side edges 16 and 17.

A vertically extending and horizontally movable needle bar 21 coacts with the rate of turn indicia 18 to indicate to the aircraft operator the rate of turn information. While not shown, this needle is pivoted on a vertical axis spaced behind the face plate. This needle bar is driven by a suitable rate of turn gyro 22 in any of the heretofore well known manners.

Further, an anticipatory movement of the rate of turn needle bar 21 may be provided to prevent lag in indication by tilting the vertical axis of the gyro 22 rearwardly in relation to the direction of flight in a manner heretofore well known.

A horizontally extending and vertically movable rate of climb needle bar 23 coacts with the rate of climb indicia 19 and 20 to indicate to the operator the rate of climb of the aircraft. This needle bar is driven by a suitable rate of climb element 24. This element may be in the form of a pneumatic capsule of a type heretofore well known. The rate of climb needle bar 23 may be provided with anticipatory movement to prevent lag in indication by use of a suitable accelerometer in a manner heretofore known.

A ball bank 25 of a type heretofore well known is provided in the indicia plate 11 below the lower horizontal edge 15 to indicate to the operator banking maneuvers. This ball bank may take the form of a curved glass tube filled with fluid and having a movable ball 25a therein and associated with indicia lines 25b. It should be appreciated that the well known mechanical pendulum type bank indicator may be used in place of the ball bank to function as a bank indicator.

Figure 2:
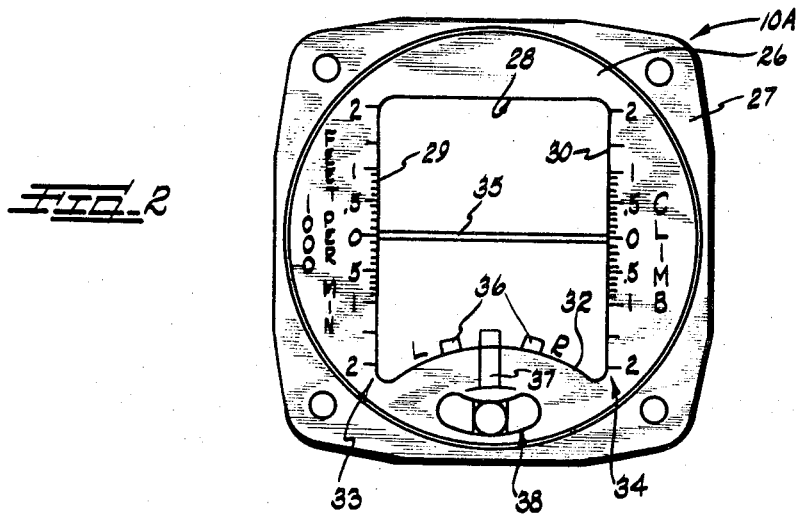
FIG. 2 is an elevational view of a modified aircraft instrument according to the invention.

The embodiment of FIG. 2, which may be referred to as a modification, includes a viewing panel 10A having an indicia plate 26 supported by a mounting ring 27, the latter of which will be mounted on an instrument panel of an aircraft. This embodiment differs from the embodiment of FIG. 1 in that a different type of rate of turn indicator is employed.

The indicia plate 26 includes a relatively rectangularly shaped opening 28 having opposed parallel vertical side edges 29 and 30, an upper horizontally extending edge 31 and a lower convex edge 32. As in the embodiment of FIG. 1, climb indicia 33 and 34 are provided along the edges 29 and 30, respectively, for coacting with the climb needle bar 35 that is driven by a suitable rate of climb element, and is therefore movable vertically along the indicia plate opening.

Stationary block legends 36 are provided on the lower convex edge 32 to coact with the rate of turn needle 37 that is driven by the rate of turn gyro to indicate the rate of turn. The needle 37 swings either left or right toward one or the other of the block legends 36. It should be further appreciated that suitable block legends might be arranged along the upper edge 31 of the indicia opening, and thereby coact with a longer needle for indicating rate of turn.

A ball type bank indicator 38 is provided on the indicia plate below the rate of turn indicator like that shown in the embodiment of FIG. 1, although it should also be appreciated that a mechanical pendulum type indicator may also be employed.

Figure 3:
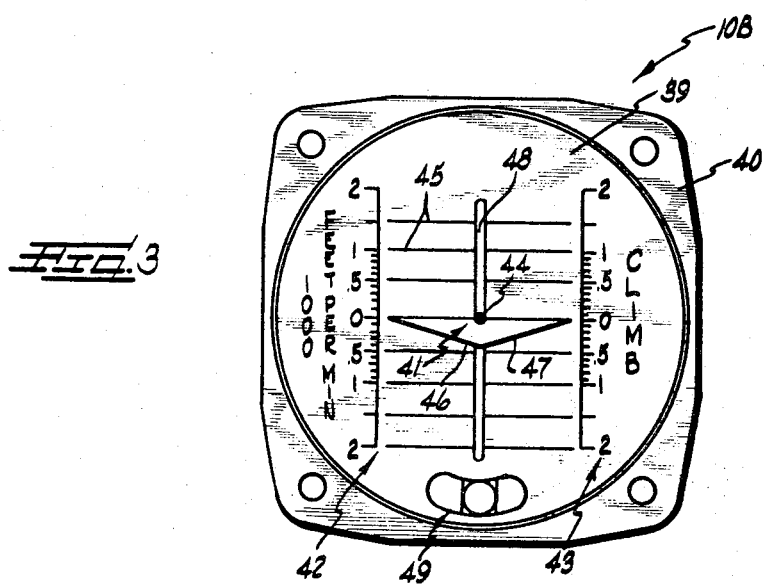
FIG. 3 is an elevational view of still another modified aircraft instrument according to the invention.
Figure 4:
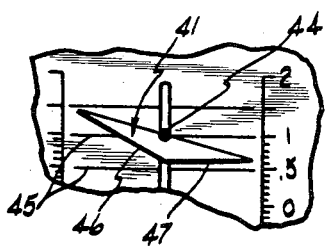
FIG. 4 is a fragmentary view of the instrument of FIG. 3 illustrating the needle indicator in a different position.

The modified viewing panel 10B shown in FIGS. 3 and 4 includes a circular indicia plate 39 supported by a mounting ring 40 that is adapted to be secured to an instrument panel of an aircraft. This modification differs from the instruments of FIGS. 1 and 2 in that a single needle indicator 41 is employed to indicate both rate of turn and rate of climb.

The indicia plate 39 includes vertically arranged and parallel spaced rate of climb indicia 42 and 43 coacting with a dot indicator 44 of the needle indicator 41 to indicate the rate of climb. Vertically spaced and horizontally extending grid lines 45 are arranged between the climb indicia 42 and 43 and coact with the inclined edges 46 and 47 of the needle indicator 41 to indicate turn rate. For example, a two minute turn rate to the right is indicated in the illustration of FIG. 4, wherein the inclined edge 47 extends parallel to the grid lines 45. This illustration also indicates by the position of the climb dot indicator 44 that the climb rate is 1000 feet per minute. Similarly, when the inclined edge 46 is in parallel relationship to the grid lines 45, such would indicate a two minute turn rate to the left.

The indicator needle 41 is therefore generally triangularly shaped with a dot along the upper edge, and is supported by a suitable bar or shaft that is interconnected to the rate of turn gyro for movement along a pivotal axis and to the rate of climb element for moving vertically along the indicia plate. A slot 48 extends vertically along the indicia plate for accommodating the supporting means for the indicator needle 41.

A ball type bank indicator 49 is provided at the lower end of the indicia plate 39 to indicate banking of the aircraft, and may also be replaced by the usual type of mechanical pendulum indicator, if so desired.

In view of the foregoing, it should be appreciated that the present invention provides a single instrument capable of giving rate of turn, rate of climb and bank information to an aircraft operator and only necessitating the operator to view a small area on the instrument panel, thereby lessening the possibility of error in use of this information.

It will be understood that modifications and variations may be effected without departing from the scope of the novel concepts of the present invention, but it is understood that this application is to be limited only by the scope of the appended claims.

The invention is hereby claimed as follows:

1. A combination turn, bank and climb indicating instrument adapted to be mounted in an aircraft comprising, an indicia plate having generally vertically arranged climb indicia and rate of turn indicia thereon, said rate of turn indicia including vertically spaced horizontal grid lines, movable climb indicator means coacting with said climb indicia to indicate rate of climb including a vertically movable dot indicator, means for driving said climb indicator means in response to movement of the aircraft, movable turn indicator means coacting with said rate of turn indicia to indicate rate of turn, said movable turn indicator means including a horizontal bar integral and vertically movable with said dot indicator and pivotally movable and having upwardly and outwardly inclined edges coacting with said grid lines, means for driving said turn indicator means in response to movement of the aircraft, and a bank indicator on said plate.

2. A combination turn, bank and climb indicating instrument as defined in claim 1, wherein said means for driving said movable climb indicator means includes a penumatic capsule, and said means for driving said movable turn indicator means includes a rate of turn gyro.

3. A combination turn, bank and climb indicating instrument as defined in claim 1, wherein said bank indicator includes a curved tube filled with fluid and having a ball movable therein.

4. A combination turn, bank and climb indicating instrument as defined in claim 3, wherein said bank indicator is positioned at the lower portion of said indicia plate.

References Cited
UNITED STATES PATENTS

| | | | |
|---|---|---|---|
| 2,027,808 | 1/1936 | Carlson | 33—204.2 |
| 2,395,250 | 2/1946 | Carlson | 33—204 |
| 2,941,400 | 6/1960 | Nesbitt | 73—178 |
| 3,060,405 | 10/1962 | Buon | 73—178 |

DAVID SCHONBERG, *Primary Examiner.*

N. B. SIEGEL, *Assistant Examiner.*